Feb. 12, 1952     C. A. BICKEL ET AL     2,585,217
AUTOMATIC LATHE
Filed May 7, 1945     10 Sheets-Sheet 2
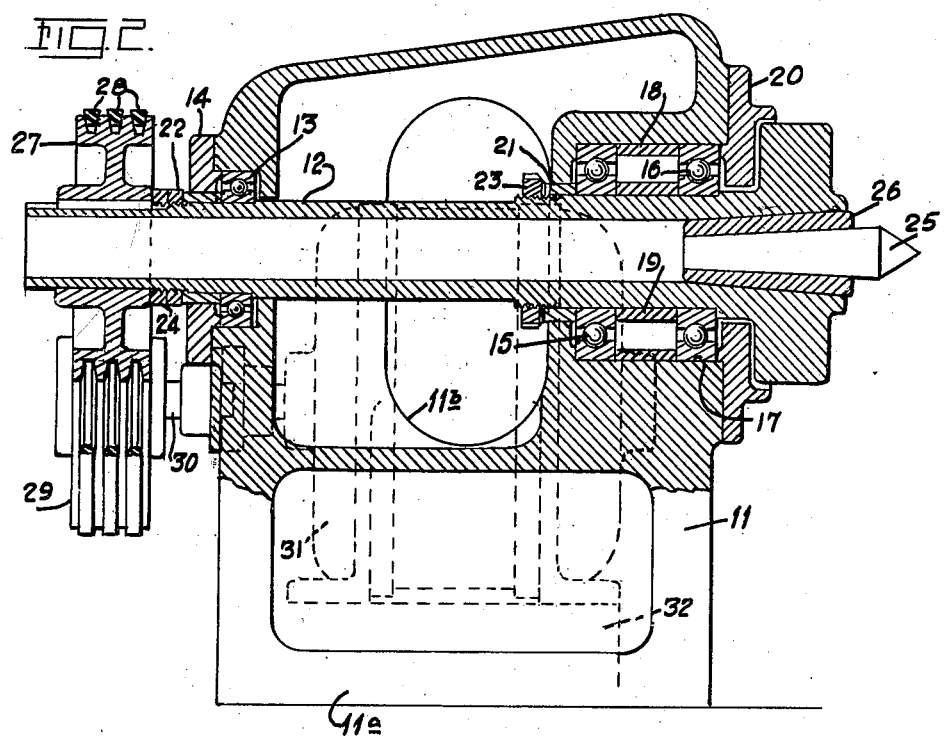
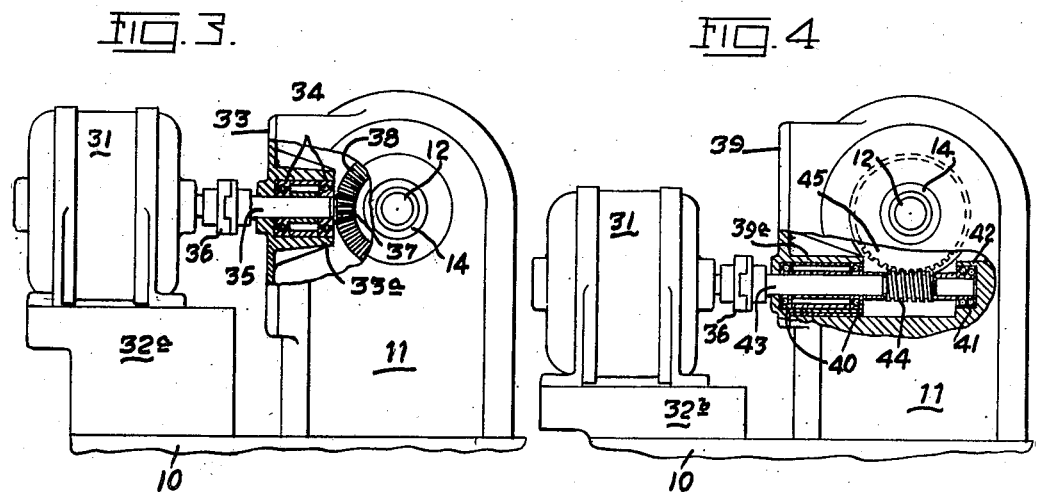
INVENTORS
CLIFFORD A. BICKEL,
STANLEY A. BRANDENBURG,
BY THEODORE FOSTER,
Toulmin & Toulmin
ATTORNEYS Feb. 12, 1952     C. A. BICKEL ET AL     2,585,217
AUTOMATIC LATHE
Filed May 7, 1945     10 Sheets-Sheet 3
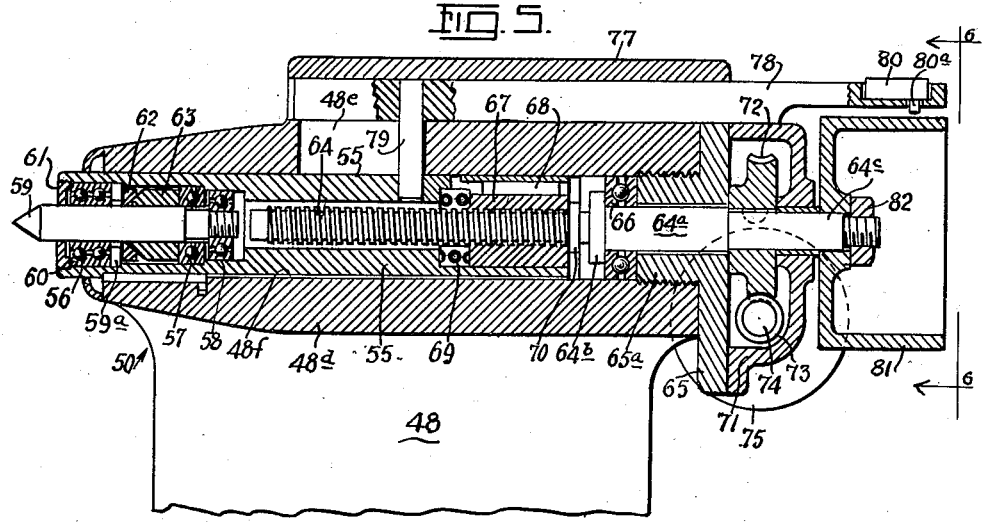
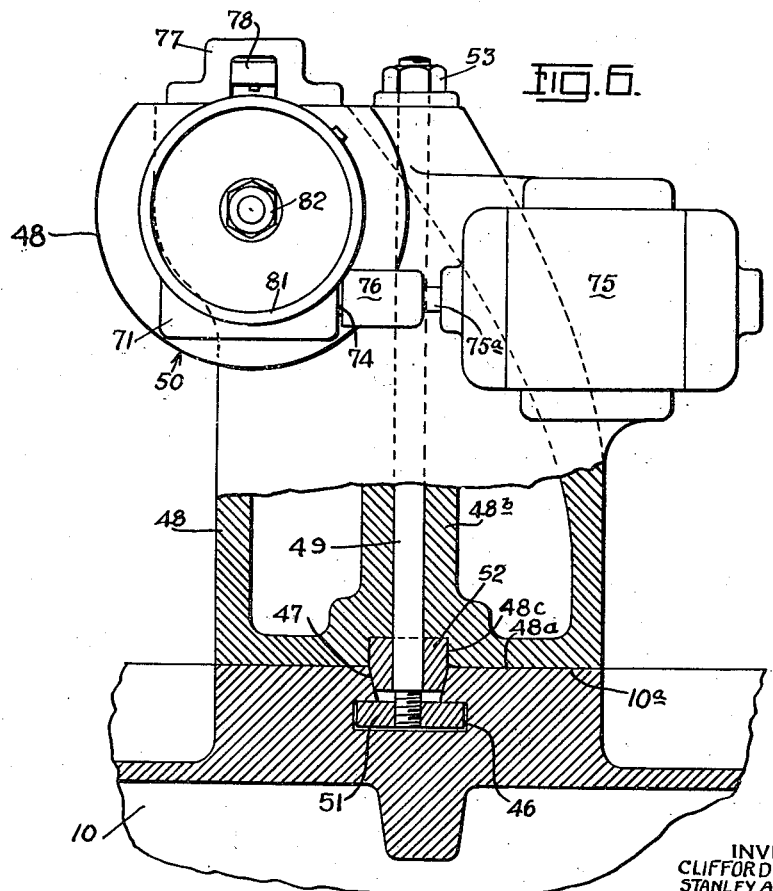
INVENTORS
CLIFFORD A. BICKEL,
STANLEY A. BRANDENBURG,
BY THEODOR FOSTER,
Toulmin & Toulmin
ATTORNEYS Feb. 12, 1952 — C. A. BICKEL ET AL — 2,585,217
AUTOMATIC LATHE
Filed May 7, 1945 — 10 Sheets-Sheet 4

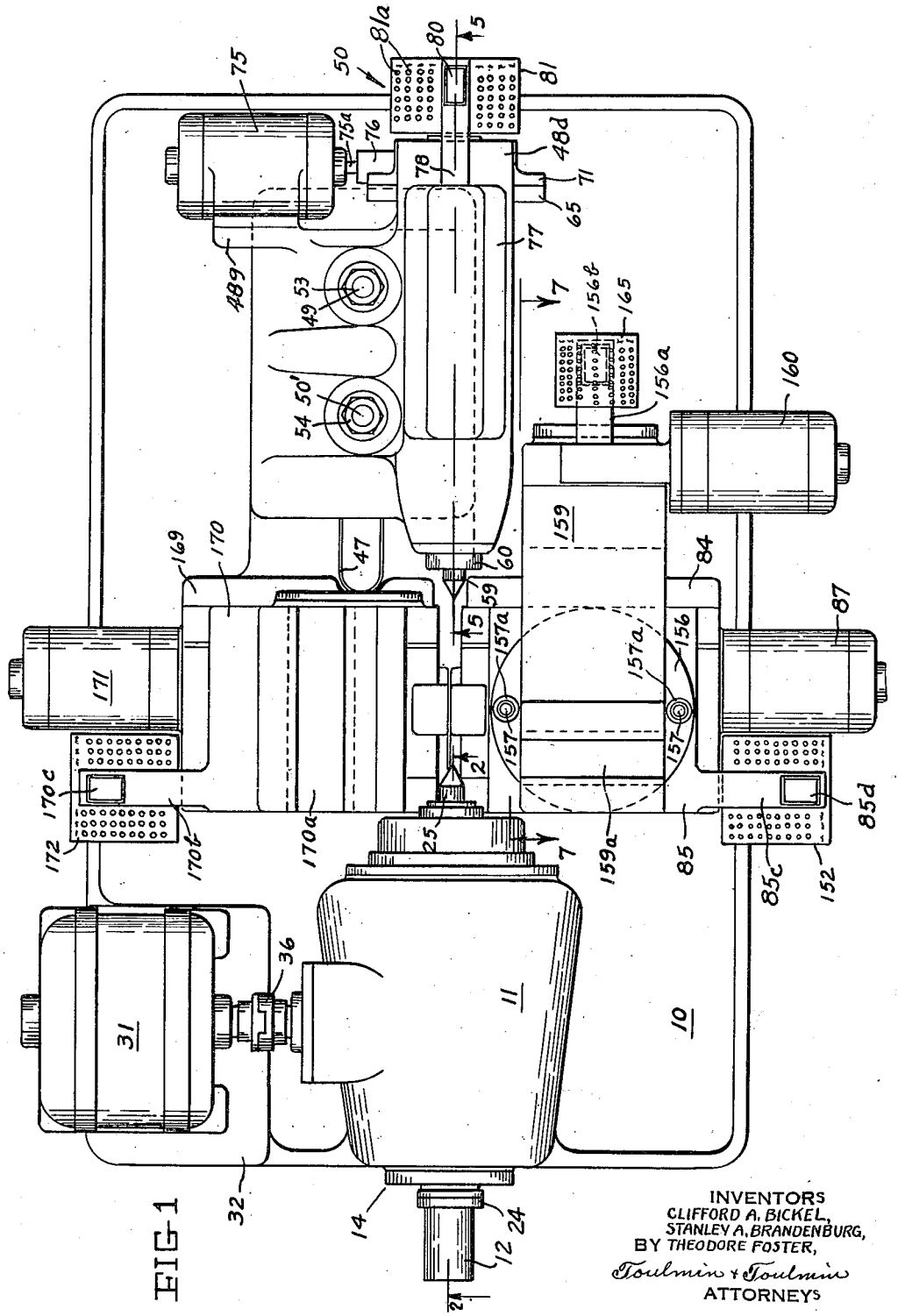

INVENTORS
CLIFFORD A. BICKEL,
STANLEY A. BRANDENBURG,
BY THEODORE FOSTER,
Toulmin & Toulmin
ATTORNEYS

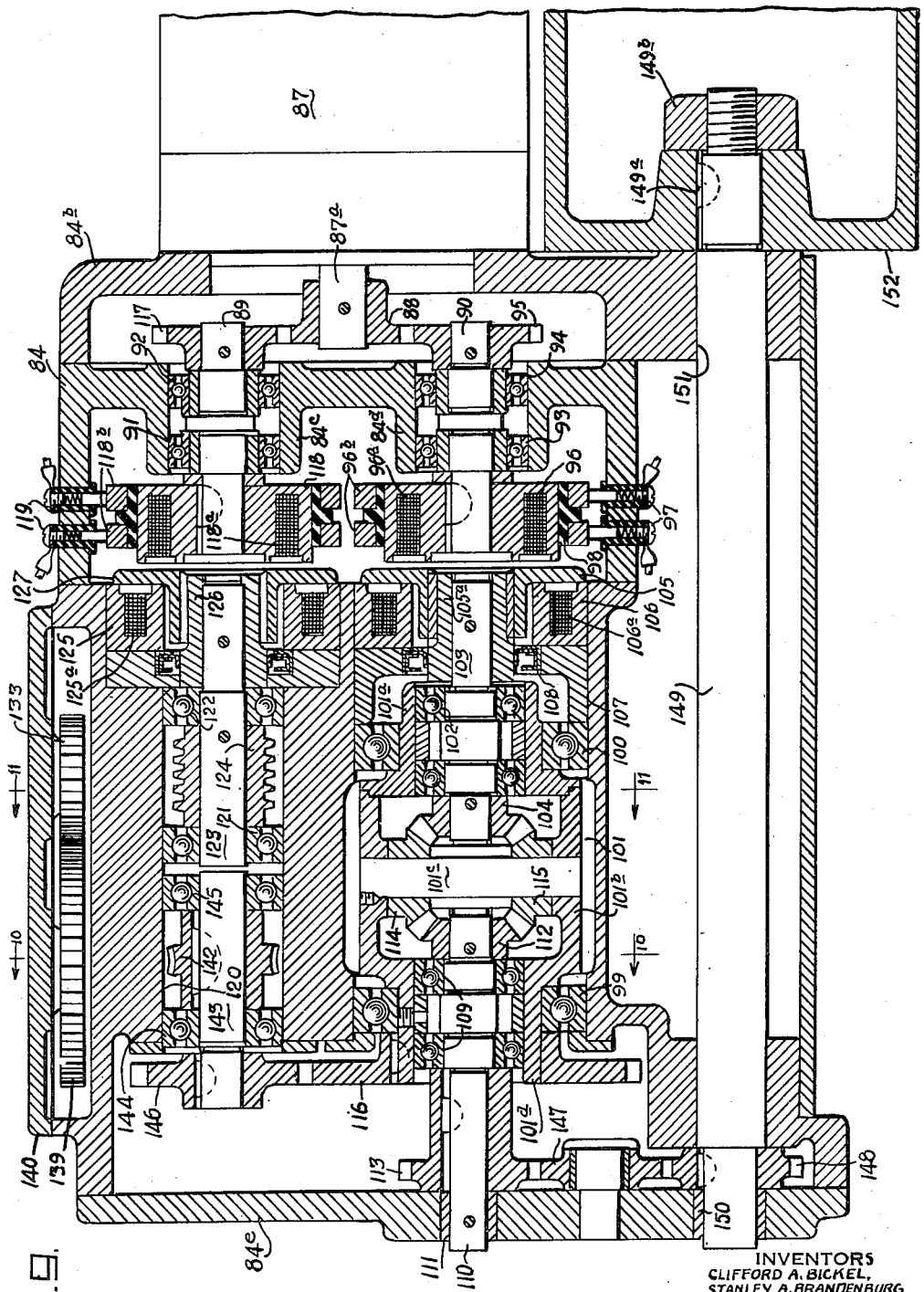

Feb. 12, 1952 — C. A. BICKEL ET AL — 2,585,217
AUTOMATIC LATHE
Filed May 7, 1945 — 10 Sheets-Sheet 6

INVENTORS
CLIFFORD A. BICKEL,
STANLEY A. BRANDENBURG,
BY THEODORE FOSTER,
Toulmin + Toulmin
ATTORNEYS

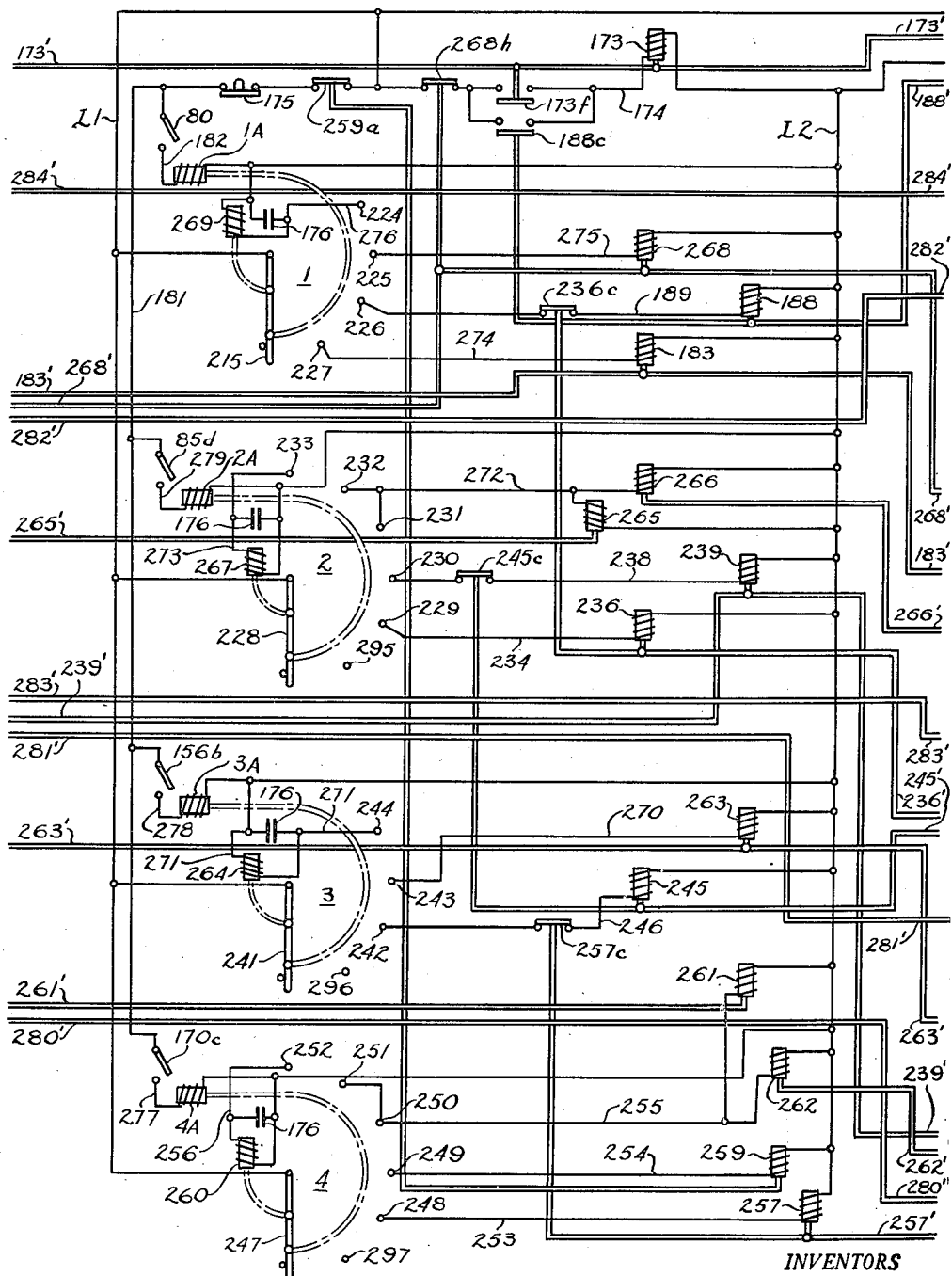

Patented Feb. 12, 1952

2,585,217

UNITED STATES PATENT OFFICE 2,585,217

AUTOMATIC LATHE

Clifford A. Bickel, Stanley A. Brandenburg, and Theodore Foster, Sidney, Ohio, assignors to The Monarch Machine Tool Co., Sidney, Ohio, a corporation of Ohio Application May 7, 1945, Serial No. 592,508

10 Claims. (Cl. 82—21)

The conventional lathe comprises in general a bed having ways upon which are mounted a headstock unit, a tailstock unit, and a carriage with cross slide and apron. Movement of the carriage is effected, in timed relation with rotation of the headstock spindle, by change gears or other speed-varying mechanism, connected to rotate a lead screw coupled to drive the carriage. Another shaft may be coupled at will to effect movement of the cross slide. Power for driving the headstock spindle is supplied from a source of power such as a line shaft or motor, such source being also connected to drive the lead screw and cross-feed screws. As such lathes are intended for general utility, they must be provided with great flexibility and a wide range of spindle speeds and speed ratios between headstock spindle and lead screws. Lathes intended for tool room use are a good example of machines requiring wide speed ranges and ratios, and great flexibility. This flexibility, in turn, requires numerous refinements that add to the first cost of the machine and its upkeep, with consequent greater expenses for overhead, depreciation and obsolescence.

On the other hand, it very frequently happens that a lathe is desired for performing a relatively few definite operations, such as the turning of a single part in a production line. Under such conditions of use, the numerous refinements of a conventional lathe are not used and are mere surplusage so far as concerns the use to which the lathe is actually put. Even when the lathe is to be shifted to another job, as when turning a different part requiring a spindle speed different from that previously required or a different gear ratio between spindle and tool feed, only relatively small changes in certain parts of the machine are required so that minor alterations in one or more elements of the machine are all that are necessary to adapt it to the new work.

It is therefore a purpose of our invention to provide a lathe having a support, together with a number of units such as headstock, tailstock, and tool slides mounted thereon, each unit being replaceable.

It is a further object to provide a lathe as aforesaid in which one or more of the units may be omitted altogether when the machine is to be used for a purpose in which such unit or units is not required.

It is another purpose of our invention to provide a lathe in which the several units may by slight changes, be adapted for different definite jobs, quickly and at slight expense.

Another object of the invention is to provide a lathe so constructed that each individual unit such as headstock, tailstock and tool carrier, is complete with its own driving motor and means for dimensionally controlling the position and range of movements of the parts adjusted thereby, without interfering with the functioning of the other units.

It is a still further object to provide a lathe having a relatively few interchangeable units whereby, by combining various ones of said units, machines having different characteristics may be made up from parts in stock, as ordered. This will greatly reduce the ultimate cost, avoid delays in filling special orders and greatly simplify the servicing and repairing of machines.

Other objects and advantages, particularly in the specific construction of the several units, will become apparent as the description proceeds.

In the drawings:

Figure 1 is a plan view of a preferred form that our lathe may take showing the headstock, tailstock, front and rear cross slides, together with the motors for individually operating the several units.

Figure 2 is a sectional view of the headstock, taken upon the line 2—2 of Figure 1, looking in the direction of the arrows, and showing a high speed belt drive such as might be required for small work pieces and light cuts.

Figure 3 is an end view, partly in section, looking from the left in Figure 1, showing a gear drive from the headstock motor to the spindle and particularly intended for medium or intermediate spindle speeds.

Figure 4 is a view similar to Figure 3 but showing the headstock spindle driven by worm and gear connections and intended for relatively slow speed work such as might be required for large work pieces and heavy cuts.

Figure 5 is a sectional view taken upon the line 5—5 of Figure 1 and showing the tailstock spindle, the motor driven connections for advancing the spindle, and the motor circuit control means for regulating the degree of actuation of the spindle.

Figure 6 is a view from the right hand end of Figure 5, as indicated by the line 6—6 of said figure, and partly broken away to show more clearly the means for securing and guiding the tailstock housing on and along the bed.

Figure 7 is a view taken on the line 7—7 of

Figure 1 with parts broken away to show more clearly the front cross slide, the swivel mounting, the operating motors and motor-controlling parts.

Figures 8, 8A:
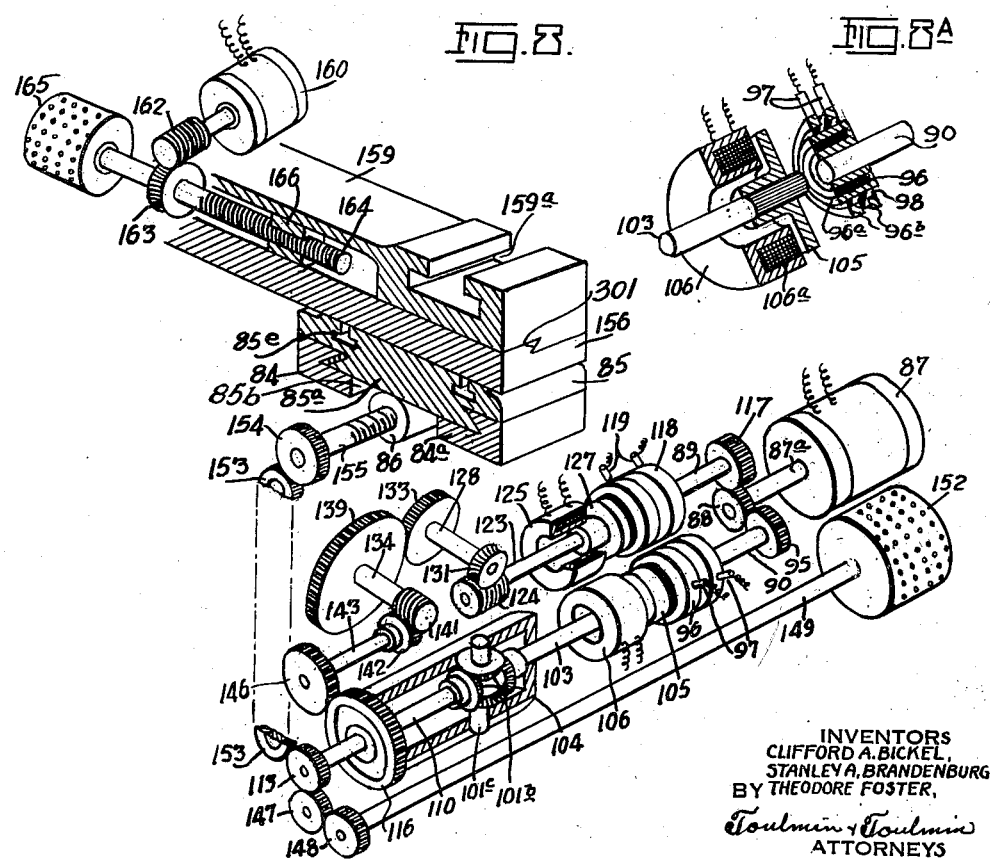

Figure 8 is a perspective schematic sectionalized view of the front cross slide and the alternative drives therefor at different speeds, together with the motor-controlling means.

Figure 8A is a detail view of one of the two magnetic clutch-brake mechanisms used in the drive shown at Figure 8 and sectionalized to show the construction thereof in greater detail.

Figure 7:
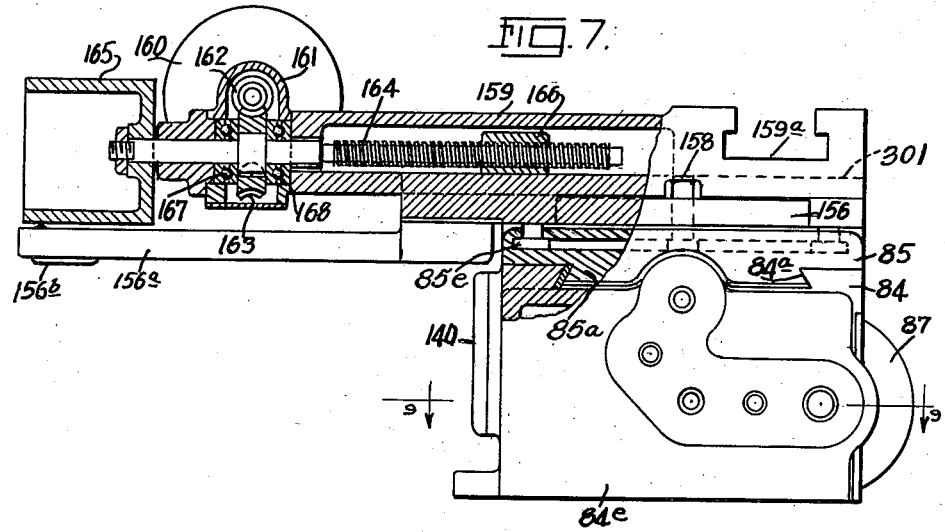

Figure 9 is a section taken on the line 9—9 of Figure 7, showing in greater detail the alternative variable-speed drive of Figure 8.

Figure 10:
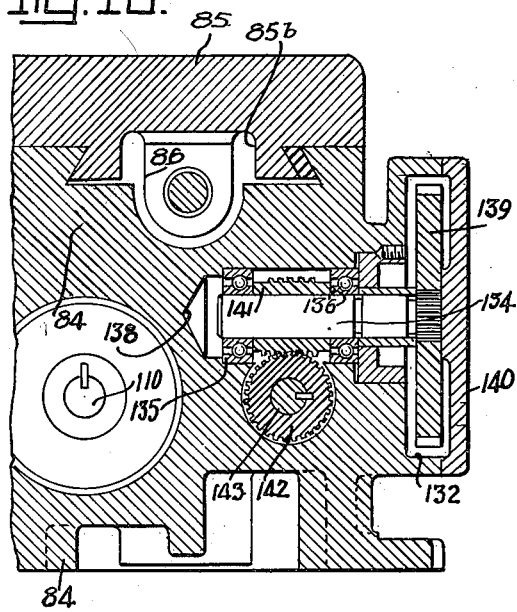

Figure 10 is a section taken upon the line 10—10 of Figure 9 showing the cross slide, actuating screw and driving mechanism extending from the change speed gear compartment.

Figure 11:
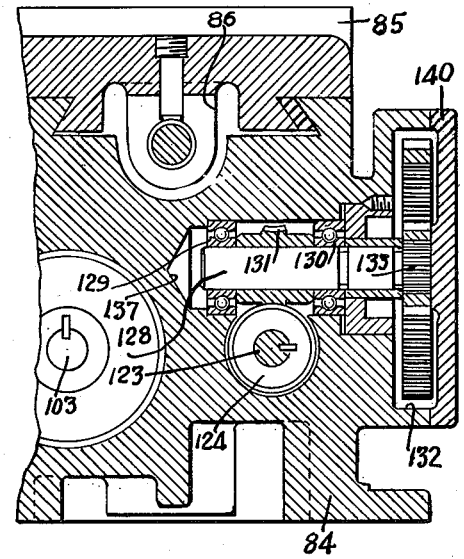

Figure 11 shows a section taken upon the line 11—11, Figure 9, and showing the cross slide, driving screw, and a portion of the drive to said screw extending into the change gear compartment.

Figure 12:
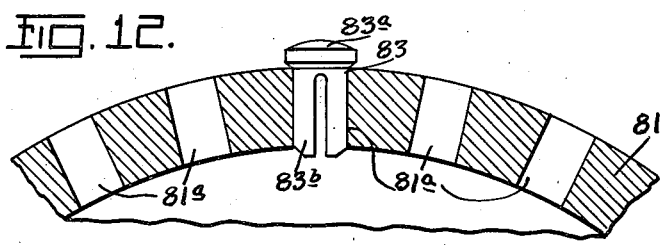

Figure 12 is a sectional view of a portion of one of the several motor switch control drums used in our lathe.

Figure 13:
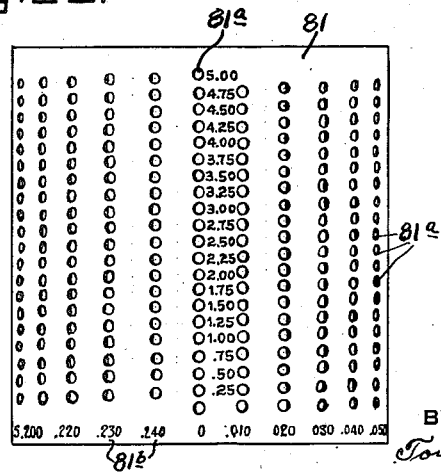
Figure 18:
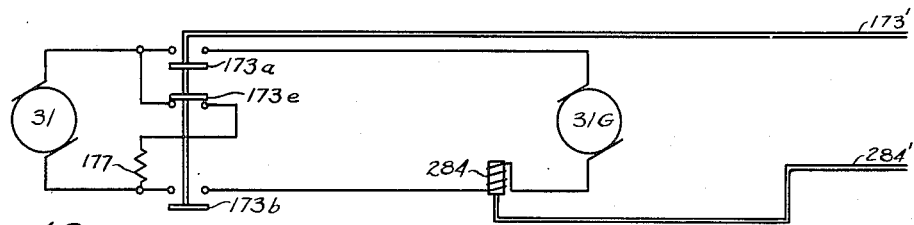

Figure 13 is a plan view of one of the drums of Figure 12 showing the helical arrangement of holes therein and the graduations thereon.

Figures 14 to 18, inclusive, are wiring diagrams showing the connections between the generators and the several motors employed for operating the various units of the lathe.

Figure 19:
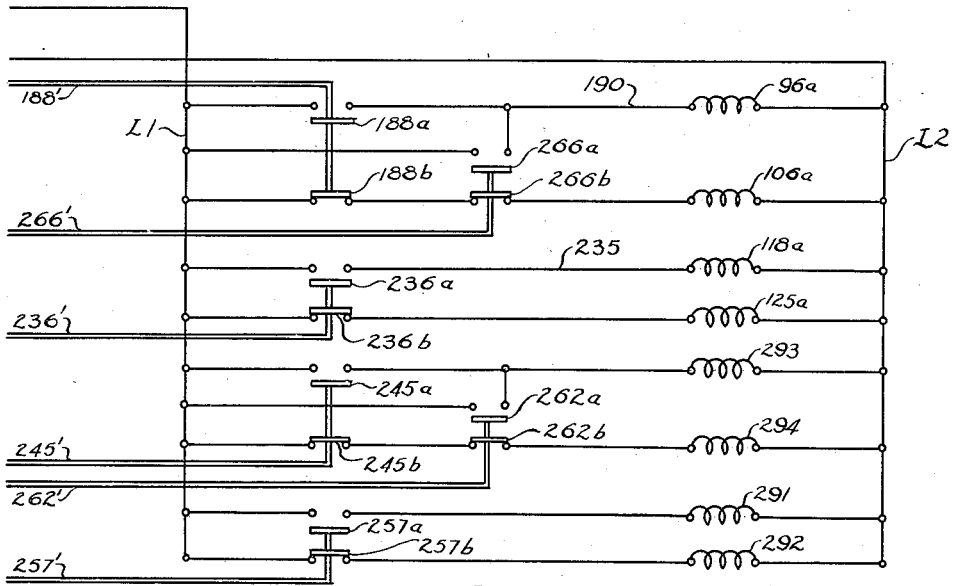

Figure 19 is a wiring diagram of the contact blades used to control the energization of the electro-magnetic clutches and brakes of the front and rear cross slides.

Figure 20 is a wiring diagram showing the operating solenoids for the various relays and also the stop switches that control the operation of the several operating coils of the entire machine whereby a completely integrated lathe is provided.

Figure 21:
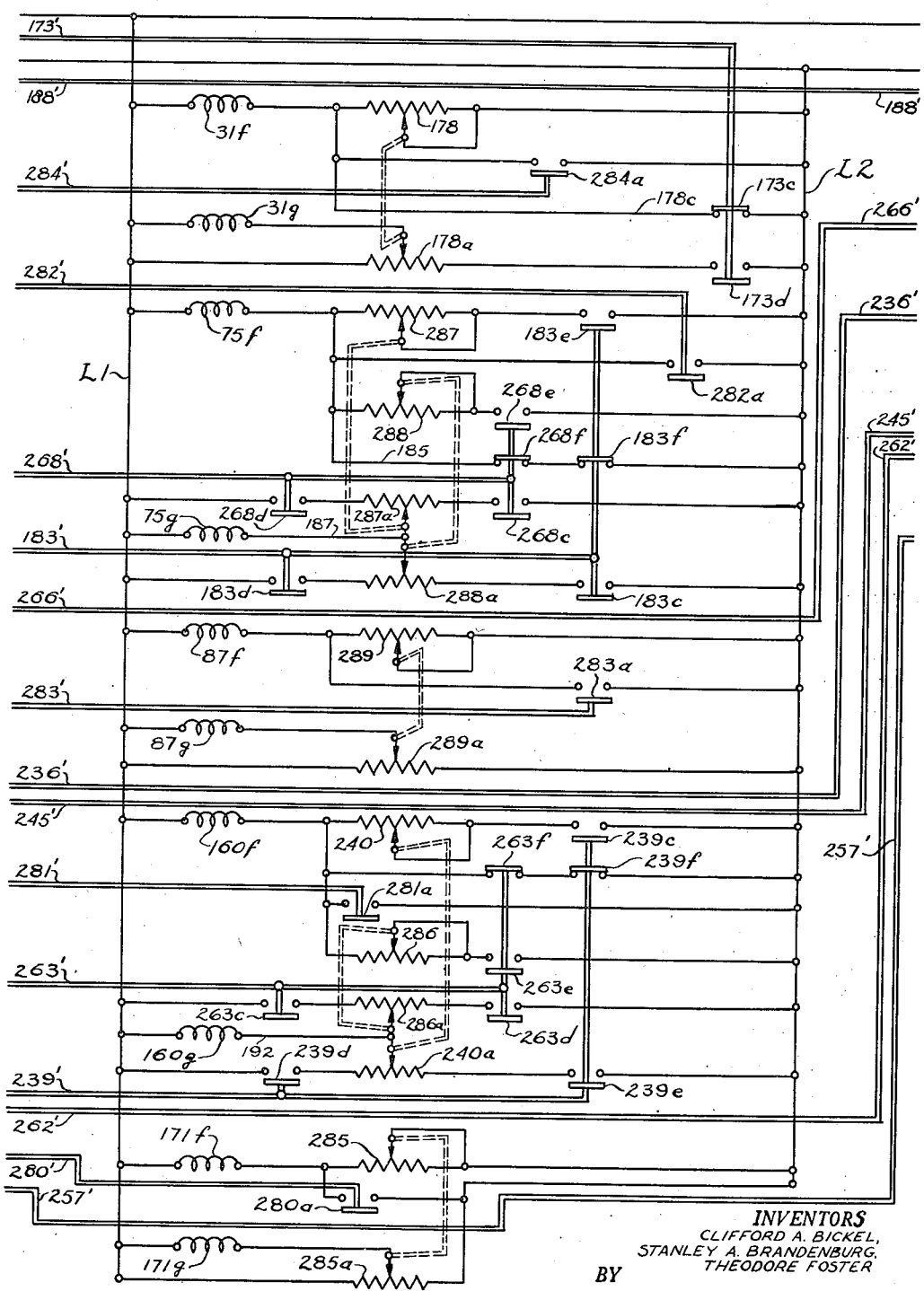

Figure 21 is a wiring diagram showing the connections to the various motor and generator field circuits.

Figure 22:
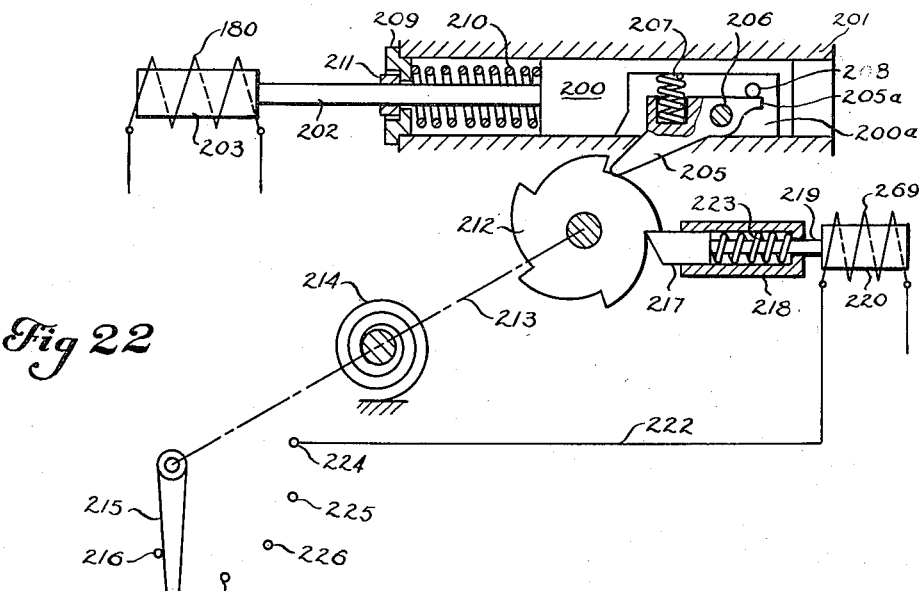

Figure 22 is a view showing the ratchet mechanism operating one of the step-by-step switches of Figure 20.

Headstock unit

Referring in detail to the drawings wherein like reference characters refer to corresponding parts throughout, and particularly to Figure 1, the numeral 10 identifies the lathe bed. This bed may consist of a conventional bench or table provided with legs or a cabinet base having compartments for coolant-circulating means, tools, accessories and auxiliary parts for use in connection with the lathe. A headstock 11 comprises a hollow casting that, as seen at Figure 2, has a base 11a adapted to be secured to bed 10 as by bolts, not shown. A spindle 12 is journaled at the left or outboard end, as seen in Figure 2, by a bearing 13 held in place by cap 14, and at the inner or work-supporting end, by bearings 15 and 16 mounted in a cored pocket 17 formed in the adjacent headstock wall. Sleeves 18 and 19 hold bearings 15 and 16 in spaced relation within pocket 17. A cap 20 is bolted to the headstock wall and acts, in conjunction with the wall of pocket 17, to hold the bearings against axial movement. Bearings 13, 15 and 16 therefore support both radial and thrust loads applied to spindle 12 which is held in position in said bearings by means of spacing collars 21 and 22 and lock nuts 23 and 24. Numerals 25 and 26 indicate a conventional center and center sleeve. Spindle 12, as shown is hollow and has the standard cam-lock type nose. It will be understood that any other well-known type of spindle may be substituted, such as a threaded or flanged type nose.

A pulley 27 having V-grooves to accommodate a number of driving belts 28 is keyed to the outboard end of spindle 12. Belts 28 pass around and are adapted to be driven by a pulley 29 mounted upon the shaft 30 of headstock motor 31 adapted for mounting upon a block 32 fixed to bed 10.

The rear side of the headstock housing is provided with a flanged opening 11b conveniently shaped as shown at Figure 2. A number of interchangeable cover and bearing plates are adapted to be secured over this opening. One of these bearing plates is indicated at 33, Figure 3. Plate 33 has an internal reinforced bearing sleeve 33a bored to receive a pair of spaced bearings 34 in which a shaft 35 is journaled. At its left end, shaft 35 carries one element of a coupling 36, the other element of which is fixed on the shaft of driving motor 31. This motor is mounted upon a block 32a that may be bolted or otherwise suitably secured to bed 10 and of the proper height to locate the motor shaft into substantial alignment with shaft 35. A bevel pinion 37 is secured to the inner end of shaft 35 and is in mesh with a bevel gear 38 secured to spindle 12 within housing 11 whereby the spindle may be driven at intermediate speeds.

Figure 4 shows the headstock equipped for slow speed driving. When such a slow speed drive is desired, bearing plate 33 is replaced by a plate 39 of the same contour and general construction as plate 33, but having its sleeve 39a positioned lower than sleeve 33a, and formed to accommodate spaced bearings 40. The headstock housing 11 is formed internally with an opening 41 positioned to receive a bearing 42 in alignment with bearings 40. A shaft 43 is mounted in bearings 40 and 42 and has a worm 44 fixed thereon and in mesh with a worm gear 45 fixed to spindle 12 within housing 11. A motor 31 is mounted upon a block 32b bolted to bed 10 and of the proper height to bring its shaft into substantial alignment with shaft 43. A coupling 36 connects the motor shaft to shaft 43 whereby the spindle may be driven at slow speeds such as might be required for heavy cuts or large work pieces.

From Figure 2, it will be noticed that, because of the stepped arrangement of spindle 12, it may be removed in an axial direction to the right by the simple procedure of removing pulleys 27 and nuts 23 and 24. The spindle has its portion to the left of the threads accommodating nut 23, formed with a key way. Both bevel gear 38 and worm gear 45 have hubs formed to fit this portion of the spindle. Thus, when a lathe is ordered that is to be used for slow speed work, a standard headstock housing 11 is fitted to bed 10. A worm gear 45 is keyed to spindle 12, a shaft 43 and worm 44 are fitted in place and a bearing plate 39 is bolted in place. Bed 32b and motor 31 are then secured in place and the headstock is complete. When an intermediate or bevel gear drive is ordered, the only changes necessary are the substitution of gear 38 for 45, bearing plate 33, shaft 35, and motor block 32a. Furthermore, either of the drives of Figures 3 and 4 may be quickly converted to a high speed belt drive simply by removing plate 33 or 39 as the case may be, together with shafts 35 or 43, placing a pulley 27 on the outboard end of spindle 12, turning motor 31 through 90° on either base 32a or 32b, and coupling its shaft to spindle 12 by a pulley and belts of the proper length. Not only is it possible to thus quickly make up a headstock from standard parts having the desired speed characteristics, but also, by the purchase of a relatively few parts, a user may quickly change his headstock from one type of drive to another.

From the foregoing description, it will be clear that bases 32a and 32b differ in height or thickness only, and that each is so designed that it may be bolted to bed 10 with the shaft of motor 31 normal to, or parallel to, the axis of spindle 12.

When parallel, the motor is positioned so that belt pulley 29 in proper position upon motor shaft 30, will be in alignment with pulley 27.

*Tailstock unit*

The tailstock unit is designated generally by the numeral 50, Figures 1, 5 and 6. As shown at Figure 6, bed 10 is formed with an undercut slot 46 extending parallel to the axis of spindle 12 but somewhat offset from said axis. This slot is in communication with a channel 47 having upwardly and outwardly sloping sides and opening into the finished top supporting surface 10a of a thickened and reinforced portion of bed 10. The tailstock housing 48 is hollow and shaped as shown at Figures 1, 5 and 6, to have a finished lower surface 48a resting on surface 10a. The base of housing 48 is formed with a pair of upstanding lugs 48b only one of which is shown in Figure 6. These lugs are drilled to receive clamping bolts 49 and 50', respectively. Each bolt is threaded at its lower end into a nut 51 riding in slot 46. A guide block 52 is secured within a channel 48c opening into the finished lower face of tailstock housing 48 and has a projecting portion shaped to accurately fit the channel 47 in bed 10. As shown at Figure 6, the bolts 49 and 50' may pass through holes in block 52. Said block is of sufficient length so that, when clamped to bed 10, housing 48 is held with its tailstock barrel in precise alignment with the spindle axis of headstock 11. Bolts 49 and 50' extend through and above the housing 48 and have nuts 53 and 54. When these nuts are loosened, housing 48 may be slid along channel 47 to a desired position, after which they are turned down to rigidly fix the housing 48 in said position.

Housing 48 is provided with an integral cylindrical enlargement 48d, offset from clamp bolts 49 and 50' as shown at Figure 1, and having a bore 48f (Figure 5) in precise alignment with the axis of spindle 12. A spindle 55 has a snug fit within bore 48f and at its forward end is bored to receive anti-friction bearings 56, 57 and 58 for a live center 59. Forward bearing 56 is maintained in position by threaded enclosure 60 of spindle 55 and plate 61. Rear axial bearing 58 is mounted to move with axial movement of spindle 55. The thrust load on center 59 is taken by thrust bearing 57 and for protection to this bearing, a spring thrust washer 62 and spool 63 are interposed between the bearing 57 and a retainer plate 59a abutting a shoulder on spindle 55.

Spindle 55 is drilled through to provide a space to receive tailstock screw 64 which is provided with a smooth rear section 64a journaled within a bore in plate 65. This plate has a threaded projection 65a engaging the adjacent internal threads of bore 48f. A thrust collar 64b is formed on screw 64 between its threaded and smooth portions and a thrust bearing 66 is located between this collar and the adjacent end of projection 65a.

At its end opposite center 59, spindle 55 is bored to receive a spindle nut 67. This nut is radially affixed to spindle 55 by a key 68. A compensating spring 69 is interposed between nut 67 and the adjacent counterbored end of spindle 55. The nut 67 and spring 69 are held axially by said counterbored end and a retainer plate 70 fastened to the end of spindle 55 by small screws, not shown. The outboard end of screw 64 has a reduced portion 64c supported in a bearing in a worm housing 71 secured to plate 65 by screws, not shown. A worm gear 72 is keyed to portion 64c within housing 71 and meshes with a worm 73 mounted upon a shaft 74 journaled in appropriate bearings, not shown, carried by said housing.

A motor 75 is bolted to an integral projection 48g (Figure 1) of housing 48 in position so that its shaft 75a is in alignment with shaft 74 and is coupled thereto by coupling 76. Thus, as motor 75 is rotated in one direction or the other, screw 64 is rotated in a corresponding direction, and acts through nut 67 to advance or retract spindle 55 and center 59.

A casting 77 of general U-shape, in cross section (see Figure 6), is affixed by screws, not shown, to a plane surface finished on the top of portion 48d and has its inner surfaces formed to slidably guide a switch bar 78 in the direction of its longitudinal dimension and parallel to the axis of spindle 55. A slot 48e is formed through the top of portion 48d and is elongated in the direction of the spindle axis. A pin 79, Figure 5, projects through this slot 48e and engages a hole in spindle 55 at one end, and a hole in switch bar 78 at its other end, whereby, the bar is slid in exact synchronism with the spindle. Bar 78 projects rearwardly, as clearly shown at Figure 5, and carries thereon a micro-switch 80 provided with a plunger 80a extending downwardly adjacent the surface of a drum 81. This drum 81 is fixed to the projecting end 64c of tailstock screw 64 by a nut 82.

As indicated at Figure 1, and in greater detail at Figures 12 and 13, drum 81 is provided with a series of radial holes 81a. These holes are drilled at equally-spaced angular intervals about the periphery of the drum on a helix that has a pitch the same as the pitch of the threads on screw 64. Each hole is adapted to receive and frictionally hold a stop button 83 having a head 83a and a slotted shank 83b. Head 83a is of the proper thickness to engage and actuate switch plunger 80a when the latter is translated with its bar 78, into the path of the rotating button. As an example, the pitch of the helix on which holes 81a are drilled, and the corresponding pitch of screw 64, may be .250 inch, while 25 holes may be drilled at equally spaced intervals for each convolution of the helix. Thus the distance between any two consecutive holes will correspond to an axial movement of .010 inch of the spindle. It will be understood that other pitches of helix and other angular spacing of the holes may be selected, as desired. Graduations 81b may conveniently be applied to drum 81 for aid in correctly positioning button 83, as shown at Figure 13.

As will be subsequently described, the switch 80 is connected in a control circuit for motor 75 whereby actuation of the switch stops motor 75 when spindle 55 and center 59 have been advanced a distance determined in a precise manner by the particular hole into which button 83 has been placed.

*The front cross slide and drive therefor*

Referring more particularly to Figures 1, 7, 8, 9, 10 and 11, bed 10 carries a base 84 whose upper surface is formed with a dove-tailed guideway 84a to slidably receive the correspondingly dovetailed projection 85a of cross slide 85 whereby slide 85 is guided for translation in a direction perpendicular to the headstock and tailstock spindle axes. A nut member 86 is secured within a channel 85b formed on the under side of slide 85. It will be noted from Figure 7 that base 84 is in the form of a hollow casting forming a housing for a variable speed drive for slide 85. This drive may include a reversible motor 87 having a shaft 87a. Motor 87 is attached to the exterior wall of a cover plate 84b of base 84, as shown at Figure 9 with its shaft projecting into said base where it carries a pinion 88. A pair of parallel shafts 89 and 90 are journaled in bearings 91, 92, 93 and 94 carried by bosses 84c and 84d formed integrally with, or rigidly attached to a portion of base 84. At one end, shaft 90 has a pinion 95 fixed thereto and in mesh with pinion 88. The housing 96 of an electromagnetic clutch is fixed to the other end of shaft 90 and carries a coil 96a connected to be energized by slip rings 96b contacted respectively by brushes 97. Rings 96b are insulated from each other and from housing 96, by insulation ring 98.

Housing 84 is formed at its left hand end as seen in Figure 9, to receive and support a pair of large ball bearings 99 and 100. These bearings rotatably support the casing 101b of a differential 101. At its right hand end this casing has a boss 101a bored to receive bearings 102 which, in turn rotatably support a shaft 103 aligned with shaft 90. At one end, shaft 103 has one bevel pinion 104 of differential 101 affixed thereto, and at its other end, an armature 105 is splined to a sleeve 105a that, in turn, is pinned to shaft 103. On the side of armature 105 opposite housing 96, a housing 106 and coil 106a of an electro-magnetic brake is secured to housing 84.

As previously stated armature 105 is splined to shaft 103 so that when coil 96a is energized, said armature is attracted and moved axially into engagement with housing 96, to thereby drivingly couple shaft 90 to shaft 103. On the other hand, when brake coil 106a is energized and clutch coil 96a de-energized, armature 105 is drawn into contact with brake housing 106, the shafts 90 and 103 are uncoupled, and shaft 103 is locked against rotation. A spacer ring 107 separates bearing 100 from housing 106 and an oil seal 108 prevents the flow of lubricant from the differential 101 into the electro-magnetic clutch.

Housing 101b has a second bored boss 101d journaled in bearing 99, and counterbored to receive bearings 109, in turn rotatably supporting a shaft 110. Shaft 110 also has a bearing 111 in the end wall 84e of base 84. A bevel pinion 112 forming a part of differential 101, is fixed to an end of shaft 110 while a pinion 113 is keyed to the other end of said shaft. Differential housing 101b is generally cylindrical in shape and carries a diametrically-extending shaft 101c on which are journaled a pair of planet bevel pinions 114 and 115, both meshing with bevel pinions 104 and 112 in a conventional manner. A large gear 116 is keyed to boss 101d, for a purpose subsequently described.

Shaft 89 has already been described. This shaft has a gear 117 fixed to one end and in mesh with motor gear 88 and, at its other end, carries a coil and housing of an electromagnetic clutch 118. As this clutch is identical with clutch 96, previously described, it is believed to be sufficient merely to point out coil 118a, slip rings 118b, insulator ring 118c and brushes 119.

Base 84 is formed with a bore 120. Bearings 121 and 122 fit this bore and support a shaft 123. A worm 124 is secured to shaft 123 between bearings 121 and 122. An armature 127 is splined to a collar 126 secured on the reduced end of shaft 123. As these parts are all identical with those of electro-magnetic brake 106, previously described, it is considered unnecessary to describe these elements in detail. It will be noted that when the coil 118d is energized, armature 127 is attracted and moved axially into engagement with clutch housing 118 to couple shafts 89 and 123, while, when the coil 125a of brake 125 is energized and coil 118a is de-energized, armature 127 and shaft 123 are locked.

Referring to Figure 11, it will be noted that a shaft 128 is journaled by bearings 129 and 130 in a pocket 137 in base 84 and has fixed thereto a worm gear 131. Shaft 128 extends into a cored pocket 132 in base 84, where it carries a change gear 133. Shaft 128 is positioned at right angles to shaft 123 and the worm gear 131 is in mesh with the worm 124 on shaft 123. A second shaft 134 is journaled by bearings 135 and 136 mounted in a pocket 138, as seen in Figure 10. Shaft 134 is parallel to shaft 128 and projects into pocket 132 where it carries a change gear 139, in mesh with gear 133. A cover plate 140 closes pocket 132 and by removal of this cover, various pairs of change gears may be substituted for 133 and 139 whereby a preselected speed ratio between shafts 128 and 134 may be chosen.

A worm 141 is fixed to shaft 134 between bearings 135 and 136, to mesh with a worm gear 142 keyed to a shaft 143. From Figure 9 it will be seen that shaft 143 is journaled in bearings 144 and 145 mounted within bore 120 so shafts 123 and 143 are in alignment. Shaft 143 projects into a compartment in one end of base 84 where it has a gear 146 keyed thereto meshing with gear 116, previously described. Gear 113, fixed to shaft 110 has been described. This gear meshes with an idler 147 that, in turn, meshes with a gear 148, keyed on the reduced end of a shaft 149, in turn journaled in plain bearings 150 and 151 carried in opposite walls 84e and 84b. The end of shaft 149 opposite gear 148, projects through wall 84b and has affixed thereto as by a key 149a and nut 149b, a drum 152 that may be similar in all respects to drum 81, previously described.

Gear 113 also meshes with and drives a gear 153, and to avoid confusion, this gear is shown at Figure 8 as broken into upper and lower halves. Gear 153 meshes with a gear 154 fixed upon a screw shaft 155 engaging nut 86, previously described. From Figure 1 it will be noted that cross slide 85 carries a rearwardly-projecting switch bar 85c having a micro-switch 85d thereon overlying and closely adjacent drum 152. As in the case of drum 81, drum 152 carries a plurality of holes arranged along a helix about the drum, any one of which may receive buttons for the actuation of switch 85d. The manner in which switch 85d is connected to control the motor 87 and coils 96a, 106a, 118a and 125a will be subsequently described in connection with the wiring circuit.

When motor 87 is operating and coil 96a is energized, shafts 90 and 103 are coupled. At the same time brake coil 106 and clutch coil 118a are de-energized, while brake coil 125a is energized to lock shaft 123. At this time, the drive from motor 87 proceeds by way of gears 88, 95, shafts 90, 103 to gear 104. As shaft 123 is locked because of energization of coil 125a, gear 116 and housing 101b are also fixed against rotation. Thus the drive to gear 104 proceeds through planetary gears 114 and 115, to gear 112, thence to shaft 110, gears 113, 153, 154, and screw shaft 155 to nut 86 and slide 85. Slide 85 and the tools carried thereby are rapidly traversed toward the work. At a desired point in the rapid traverse, as will be subsequently described, a button on drum 152 operates switch 85d which, through appropriate relays, de-energizes clutch coil 96a and brake coil 125a, and energizes clutch coil 118a and brake coil 106a. Shafts 89 and 123 are thereby connected for conjoint rotation, while shaft 103 and its differential gear 104, are locked against rotation.

A slow feeding drive is now imparted to slide 85 from motor 87 by way of gears 88, 117, shafts 89 and 123, worm 124, gear 131, shaft 128, change gears 133 and 139, shaft 134, worm 141, gear 142, shaft 143, and gear 146 to gear 116 affixed to differential housing 101b. As gear 104 is fixed at this time, the drive continues from housing 101b to shaft 101c, gears 114 and 115, gear 112, shaft 110 and thence to screw shaft 155 as previously traced. Because of the speed reduction effected by worm and gear connections 124, 131 and 141, 142, the drive just traced affords a slow feeding traverse of slide 85; and by the selection of the proper pair of speed change gears, 133 and 139, the tools on slide 85 may be moved into the work at the proper speed. At the proper time as will be subsequently explained, motor 87 is reversed and coils 125a and 96a are energized while 118a and 106a are de-energized. Rapid retraction of slide 85 is thereby effected until motor 87 is de-energized to complete a cutting cycle.

From Figure 7, it will be noted that slide 85 is provided with a circular T-slot 85e. A sub-base 156 is mounted upon a pivot bearing, 158, Figure 7, that is carried by slide 85 concentric of slot 85e. T-head bolts 157, Figure 1, have their heads riding in slot 85e and project through holes in sub-base 156 so that, when nuts 157a are tightened said sub-base may be locked in a selected position of pivotal adjustment upon slide 85. Base 156 has a dovetailed groove 301 extending diametrically of pivot 158 to receive and guide a complimentary top slide 159. This slide carries at one end a motor 160 having a shaft extending into a gear housing 161 where it has a worm 162 secured thereto. This worm meshes with a worm gear 163 keyed to feed shaft 164, in turn, journaled in top slide 159 upon an axis extending parallel to the direction of motion of slide 159 upon sub-base 156. A smooth end of shaft 164 projects exteriorly of slide 159 and there carries a perforated drum 165 similar in all respects to drum 81 previously described. Thrust upon shaft 164 is taken by bearings 167 and 168 mounted at either side of worm gear 163.

A nut 166 is secured to sub-base 156 and extends upwardly into a channel formed in top slide 159. Shaft 164 engages a threaded hole in nut 166. As shown at Figure 7, sub-base 156 has a switch bar 156a extending therefrom parallel to the direction of screw 164. A microswitch 156b is fixed to the end of arm 156a so that its plunger is closely adjacent the surface of drum 165 and may be actuated by buttons selectively positioned upon the surface of said drum, as described in connection with drum 81, Figure 13. Switch 156b is connected in a controlling circuit for motor 160 as will be later described.

The conventional method of operating the carriage and slides of a lathe is by means of shafts and gears linked to and driven by the main motor of the lathe. Our present invention, to the contrary, uses a top swivelling slide, with individual motor for operating it and a bottom slide also having its own motor and driving means. It will be noted that top slide 159 can easily be removed, leaving the bottom slide 85 intact. Top slide 159 may be conveniently formed with a T-slot 159a by which any tools desired may be attached thereto for operation upon a work piece held between centers 25 and 59. By swivelling base 156 upon cross slide 85, the direction of translation of top slide 159 may be placed at any desired angle with respect to the axis of rotation of the work as determined by the aforesaid centers.

The rear cross slide is similar in all respects to the front cross slide, and may be similarly operated. In short the only difference between the two, apart from location, is that the sub-base 156 and the parts carried thereby, are omitted. For this reason it is deemed unnecessary to show and describe the rear cross slide in detail and, referring to Figure 1, it will be sufficient, merely to identify base 169, slide 170 and its T-slot 170a, switch bar 170b, and microswitch 170c. Motor 171 corresponds to motor 160, and may be connected by a similar drive to slide 170 by the mechanism previously described in connection with Figures 9, 10 and 11. A drum 172 is mounted upon a shaft rotated in 1 to 1 relation with the feed screw for slide 170 and may carry buttons selectively adjustable for actuation of switch 170c and control of motor 171. Thus both front and rear cross slides may be used alternatively or simultaneously, as desired or as required by the characteristics of a particular job.

The electrical circuit

Our invention includes novel means for energizing the various circuits by which motors 31, 75, 87, 160 and 171 as well as electro-magnetic brake and clutch coils 96a, 106a, 118a, and 125a, are energized and deenergized. At Figure 22 is shown a ratchet relay mechanism of which a number are used in the electrical hook-up. As shown, a slide 200 fits within a bore 201 for straight line movement. A rod 202 is attached at one end to slide 200 and at its other end to the core 203 of a coil 180. Slide 200 has a pawl 205, pivoted on a pin 206 and urged toward counterclockwise rotation as seen in Figure 22, by a spring 207. Pawl 205 is mounted within an opening 200a in slide 200 and has a nose 205a engaging a pin 208 carried by slide 200 and projecting into said opening and preventing counter-clockwise rotation of pawl 205.

A plug 209 may be threaded within the forward end of bore 201 to form, with the adjacent end of slide 200, stops for a coil spring 210 surrounding rod 202 and urging plunger 203 and slide 200 to the right. Movement of these parts to the right is limited by a key 211 passing through an aperture in rod 202 and, in the position shown, engaging plug 209.

A ratchet wheel 212 is fixed to a shaft 213 indicated by a dot-dash line. A coil spring 214 has one end fixed to shaft 213 and its other end to a fixed surface, whereby to urge shaft 213 into clockwise rotation. Such rotation is limited by a relay contact arm 215 fixed on said shaft and a pin 216 lying in the path of said arm. A stop latch 217 is provided for wheel 212 and is slidably mounted in a fixed guide 218. A rod 219 connects latch 217 to a core 220 of a solenoid or coil 269 that, as shown, is connected by a line 222 to one terminal 224, of contact arm 215. A compression spring 223 within guide 218, urges latch 217 into engagement with ratchet wheel 212, as will be clear from inspection of Figure 22.

The number and spacing of teeth or projections on wheel 212 corresponds to the number, including the position at the pin 216, and spacing of contacts over which arm 215 moves, and it will be clear from Figure 22 that each time coil 180 is energized, pawl 205 is advanced into contact with wheel 212 and rotates the same one step against the resistance of spring 214, to thereby move arm 215 from one contact to the next succeeding contact. As the arm moves into engagement with said next succeeding contact latch 217 snaps into position behind a tooth of wheel 212 and prevents retrograde rotation of said wheel when, under urge of spring 210, slide 200 and pawl 205 are moved to the position shown. However, when coil 269 is energized as arm 215 engages contact 224, latch 217 is retracted from contact with wheel 212 and, under urge of spring 214, arm 215 is rotated to its initial position against stop pin 216. A total of four contacts, 224 to 227, inclusive, are shown in Figure 22.

In the wiring diagram of Figure 20, four of these ratchet relay mechanisms are used. Each is identical with the others except for the number of contacts over which its arms moves and, of course, the number of teeth on its ratchet wheel.

Figures 14 to 18, inclusive, show the armature circuits for the several motors 31, 75, 87, 160 and 171, and it will be noticed that D. C. motors are used in each instance and that each is supplied with current by its own individual generator which is identified by the same reference numeral as its motor, with the letter "G" added. In practice all generators 31G, 75G, etc., are driven from the same A. C. motor, not shown. Each motor has a reversing connection in its circuit, and motors 31, 75 and 160 have dynamic brake resistors 177, 290 and 184, respectively, connected across their armatures, which act to bring the respective armatures to a quick stop when the energization circuits are opened and the dynamic braking circuits closed.

Figures 14 through 21 are interconnected by actuating rods which connect the relays and the relay contacts actuated thereby. These actuating rods have been designated by a prime (') of the reference character of the respective relay.

Figure 14:
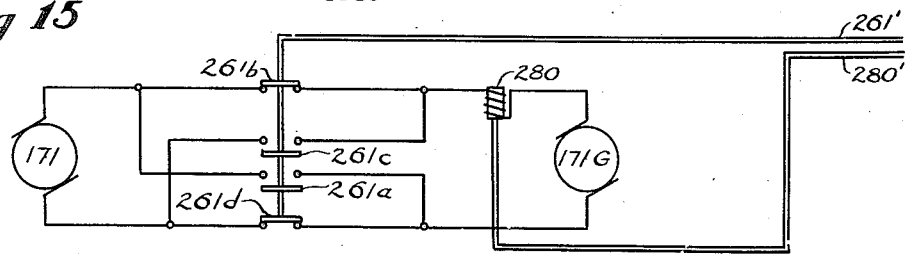

Referring to Figure 14, generator 171G has its armature connected with the armature of motor 171, through a relay coil 280, normally closed blades 261b, the armature of motor 171 normally closed blades 261d, and back to the generator. Reversing connections are provided including normally open blades 261a and 261c. The purpose of coil 280 is to cut out resistance in the field coils of motor 171 when said motor has been brought up to a predetermined speed. This will be clear from a consideration of Figure 21, where it will be noted that energization of coil 280 (Figure 14) acts to close blades 280a and hence to short adjustable rheostat 285 of motor field coils 171f. Similarly, motor-generator sets 160—160G; 75—75G; 87—87G; and 31—31G, each have relay coils 281, 282, 283 and 284, respectively, in their main circuits. Each coil, when energized as the current therein rises above a predetermined valve, acts to close blades identified on Figure 21 by the same numeral with the letter "a," whereby all resistances in the circuit of its field coils are cut out. As the operation of these auxiliary relays is obvious, it is deemed unnecessary to describe each one in detail.

All five of the motors used are controlled by conventional variable field, variable armature voltage control using D. C. motor-generators and variable speed D. C. motors. These controls will be described briefly by reference to Figure 21, where the field coils of the respective motors are identified as 171f, 160f, 75f, 87f and 31f, while the field coils of the corresponding generators, are identified as 171g, 160g, 75g, 87g and 31g reading from bottom to top of said figure in both cases.

Motor field coils 171f are in series with an adjustable rheostat 285 when blades 280a are open. Likewise generator field coils 171g are in series with an adjustable rheostat 285a. Rheostats 285 and 285a are mechanically connected, as indicated by the double dotted line for adjustment in unison, whereby the field characteristics of both motor and generator are simultaneously adjusted.

Motor field coils 160f have a pair of parallel connected rheostats 240 and 286 in their circuit. Each rheostat has its counterpart 240a and 286a, similarly connected in the circuit of generator field coils 160g. Rheostats 240 and 240a are mechanically connected for simultaneous adjustment. The same is true of rheostats 286 and 286a. Motor field coils 75f have a pair of parallel connected rheostats 287 and 288 in their circuit. Each has a counterpart 287a and 288a in the circuit of generator field coils 75g. Each pair 287, 287a and 288, 288a are mechanically connected for simultaneous adjustment. Field coils 87f have a rheostat 289 in their circuit and generator field coils 87g have a corresponding rheostat 289a in their circuit, the two rheostats being mechanically connected, as previously described. Likewise rheostats 178 and 178a, mechanically connected, are in the circuits of motor field coils 31f and generator field coils 31g, respectively. The operation of the contact blades controlling the respective circuits will be subsequently explained. The arrangement of armature circuits of the motors 160, 75, 87, and 31, shown at Figures 15, 16, 17 and 18, respectively, will be obvious upon inspection, in view of the foregoing description.

Referring to Figure 20, the main supply lines are indicated at L1 and L2. A headstock motor relay coil 173 is connected in series in a line 174 extending between lines L1 and L2 by way of the paralleled normally open contacts 173f and 188c, and the normally closed contacts 269h. The contacts 173f provide a holding circuit for the relay 173 which are closed by energization of coil 173. Energization of coil 173 also operates to close normally open blades 173a and 173b, Figure 18, and to open normally closed blades 173e connected in series with a dynamic brake resistor 177 of conventional design and intended to stop motor 31 quickly when the circuit thereto from generator 31G is opened. Energization of relay coil 173 also acts to open the normally closed blades 173c, Figure 21, of a shunt circuit 178c for the circuit of the field coils 31f of motor 31. When blades 173c are closed, adjustable rheostat 178 is shunted. However, when said blades are open, current through field coils 31f must flow through resistor 178 whereby the speed of motor 31 may be varied in a well-known manner in accordance with the setting of said rheostat 178. Energization of relay coil 173 also closes normally open blades 173d, which thereupon causes energization of the field coil 31g of generator 31G according to the setting of the rheostat 178a.

With the machine at rest, the four switches 80, 85d, 156b and 170c, are closed by engagement of their operating plungers with the rear stops or buttons upon the respective drums 81, 152, 156 and 172. All the generators 31G, 75G, 87G, 160G, and 171G may be driven from a main drive motor, not shown. Such main drive motor may also drive an exciter generator for supplying a control voltage across the lines L1 and L2, thus all generators will rotate and a control voltage will be applied across lines L1 and L2 at the same time. The control voltage will energize the coils 1A, 2A, 3A and 4A to advance the arm of the respective step relays 1, 2, 3 and 4 to the first contact 227, 295, 296 and 297, respectively. Since the last three mentioned contacts are blank, no electrical conditions are changed. However, when arm 215 of the step relay 1 advances to contact 227, the tailstock motor forward relay 183 is energized, closing normally open blades 183a and 183b, Figure 16, to thereby close the armature circuit of motor 75 and start the latter. At the same time, normally closed blades 183g are opened, thus cutting out of the circuit the dynamic brake resistor 290. Referring to Figure 21, it will be noted that energization of relay coil 183, as aforesaid, also acts to close blades 183c and 183d to thereby close a circuit from line L1, blades 183d, rheostat 288a and blades 183c, to line L2. Closure of blades 183c also acts to energize the field coils 75g of generator 75G from line L1, coils 75g, line 187, the effective portion of rheostat 288a, and blades 183c to line L2. At the same time, blades 183e, Figure 21, are closed, to thereby close a circuit through the field coils 75f of motor 75 by way of line L1 coil 75f, rheostat 287, and blades 183e to line L2. Also normally closed blades 183f are opened, to make certain that the shunt circuit 185 remains open at this time. Generator 75G thereupon delivers current to motor 75 which rotates at a speed dependent upon the adjustment of rheostats 287 and 288a, as will be understood.

Motor 75 now drives the tailstock center in to engage the work. When switch 80 moves off the outer stop button on drum 81 as its bar 78 advances with spindle 55, said switch opens. A second button is positioned upon drum 81 to again close switch 80 after the tailstock center has advanced the desired amount, that is, the amount necessary to engage and rotatably support the work piece. This again energizes coil 1A and causes its ratchet mechanism to advance arm 215 another step to terminal 226, thus de-energizing coil 193 and opening blades 183a, b, c, d, and e to stop motor 75 and energizing relay coil 188. The closing of blades 183f puts full field on the motor 75, to thus aid the dynamic braking caused by closing of blades 183g.

Figure 17:
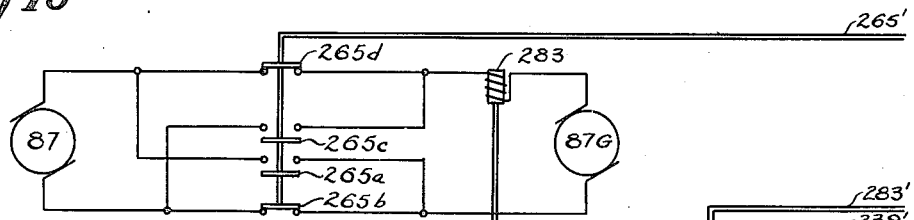
Figure 15:
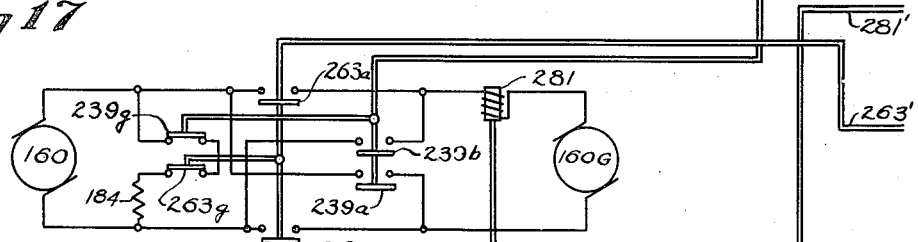

It will be noted from Figures 17 and 21, that the armature circuit of motor-generator 87, 87G, is normally closed. This is true also of their field circuits, so that motor 87 begins to run as soon as the motor driving generator 87G is started. However, as the circuits of clutch coils 96a and 118a are open at this time, as will be noted by reference to Figure 19, operation of motor 87 has no effect upon the machine. It will also be noted that the circuits of brake coils 106a and 125a are normally closed so that energization thereof takes place as soon as the master switch, not shown, is closed. Energization of coil 188, as aforesaid, closes blades 188, Figure 19, and energizes rapid traverse clutch coil 96a, by way of line L1, blades 188a, line 190, coil 96a, to line L2. Armature 105 is thereby attracted to connect shafts 90 and 103, and, as brake coil 125a is energized, the cross slide 85 is thereby rapidly moved toward the work piece rotating between centers 25 and 59. The contacts 188b open to de-energize the front RT brake 106a. Contacts 188c close to energize the headstock motor relay 173, and start the headstock motor 31. The contacts 173f close to establish a holding circuit for the relay 173. As soon as slide 85 starts to move, it moves switch 85d off the rear limit stop button on drum 152 and opens the same. As soon as the rapid traverse stop button on drum 152 engages and again closes switch 85d, coil 2A is energized and moves arm 228 of relay 2 into engagement with its first contact 229. Current now flows from line L1 through arm 228, contact 229, line 234 and coil 236 to line L2. Energization of coil 236 closes blades 236a, Figure 19, and energizes front feed clutch coil 118a, by way of line L1, blades 236a, line 235 and coil 118a to line L2. Coil 236 also acts to open blades 236b, and de-energize the coil 125a of feed brake 125. It also acts to open normally-closed blades 236c, Figure 20, and thus de-energize coil 188, whereby the circuit through coil 96a of rapid traverse clutch 96 is opened and shaft 90 is uncoupled from shaft 103. Also blades 188b are permitted to close, thus energizing coil 106a of a rapid traverse brake and locking shaft 103. Shafts 89 and 123 are thus locked together by energization of clutch coil 118a and feeding movement of front slide 85 now proceeds at a greatly reduced rate by way of change gears 133 and 139, as previously explained, whereby a tool on top slide 159 is fed into the work.

Upon contacting the stop button on drum 152, switch 85d is again closed, energizing relay coil 2A and advancing arm 228 of ratchet relay 2 to contact 230. This acts to de-energize relay coil 236 and to open blades 236a and close 236b whereby coil 118a is de-energized to disconnect shafts 89 and 123 and to energize brake coil 125a, thus stopping the transverse feed, since clutch coil 96a is also open at this time. Motor 87 continues to rotate, however.

With contact 230 closed, the front longitudinal relay coil 239 is energized by way of line L1, arm 228, contact 230, normally closed blades 245c, line 238 and coil 239 to line L2. This acts to close blades 239a and 239b, Figure 15, to connect longitudinal feed motor 160 with its generator 160G. At the same time blades 239c, 239d and 239e, Figure 21, are closed while blades 239f and 239g are opened, thus connecting the resistance 240 in series with the field coils 160f of motor 160, and also energizing the generator field coils 160g of generator 160G by way of line L1, coils 160g, line 192, rheostat 240a, and blades 239e, to line L2. Also, the dynamic braking resistor 184 is removed from its shunt across the motor armature 160. Motor 160 now starts and as the stop button on drum 165 moves, switch 156b is opened. The top slide 159 and its cutting tool are now fed longitudinally along the work. At a desired point in the movement of slide 159, switch 156b is again closed by a button properly positioned on drum 165, thus energizing coil 3A of ratchet relay 3 whereby arm 241 of said relay is advanced one step into contact with contact 242, thus energizing relay coil 245 by way of line L1, arm 241, contact 242, normally closed contact 257c, line 246 and coil 245 to line L2. Energization of coil 245 acts to relay power to the rear traverse clutch coil 293, Figure 19, by closure of blades 245a and to open blades 245b to de-energize rear rapid traverse brake coil 294. Also blades 245c in the circuit of relay coil 239 are opened, thus stopping the longitudinal feed. As blades 257a of rear feed clutch coil 291 are open while blades 257b of rear feed brake coil 292 are closed at this time, motor 171 is connected to provide rapid in-traverse to rear slide 170, and upon movement of the rear slide 170, the switch 170c opens.

When the rear slide 170 has reached the limit of its in-traverse as determined by the adjusted position of a button on drum 172, switch 170c is closed by said button, thus energizing coil 4A of ratchet relay 4 and advancing its arm 247 into contact with terminal 248. This movement of arm 247 acts to energize relay coil 257. Energization of coil 257 closes blades 257a, Figure 19, and energizes the coil 291 of the rear feed clutch, while at the same time opening blades 257b to de-energize coil 292 of the rear feed brake. This acts to connect motor 171 through the feed drive, as explained in connection with Figure 9, and to advance the tool on slide 170 into the work at the proper feeding speed. Contacts 257c are opened to de-energize the rear traverse coil 245. Switch 170c again opens upon movement of the slide 170.

When the rear slide 170 has reached the limit of its feed travel as determined by a button on drum 172, switch 170c is again closed thereby, moving arm 247 of ratchet relay 4 to contact terminal 249, thus energizing relay coil 259 by way of line L1, arm 247, contact 249, line 254 and coil 259 to line L2. Energization of a time delay relay coil 259 acts to open the blades 259a, Figure 20, which close again after a predetermined length of time, thereby moving all ratchet relay arms 215, 228, 241 and 247 one step into engagement with contacts 225, 231, 243 and 250, respectively. Movement of the arms of the ratchet relays, as aforesaid, energizes relay coils 268, 265, 266, 263, 261 and 262. Energization of coil 262 closes blades 262a and opens blades 262b, Figure 19, thus energizing rear rapid traverse clutch 293 and de-energizing rear rapid traverse brake 294. Energization of coil 261, acts to close blades 261a and 261c, Figure 14, and to open blades 261b and 261d, thus reversing motor 171 as will be obvious from inspection of the figure. Energization of coil 263 operates to start motor 160 in the reverse direction by closure of blades 263a and 263b and opening of blades 263g to cut out brake resistor 184, as will be clear from inspection of Figure 15. The field coils of motor 160 and generator 160G, are properly energized by the closure of blades 263e, 263c and 263d, and the opening of blades 263f, respectively, Figure 21, as will be understood from previous descriptions. Motor 160 therefore acts to move top slide 159 toward starting position at a rapid traverse rate since rheostat 286 weakens motor field 160f.

Energization of relay coil 266, closes blades 266a and opens blades 266b, Figure 19, to energize front rapid traverse clutch coil 96a, and to de-energize front rapid traverse brake coil 106a. As front feed brake coil 125a is closed at this time, because of closure of blades 236b, while front feed clutch coil 118a is de-energized, motor 87 is connected to effect rapid retraction of cross slide 85. Energization of relay coil 265, closes blades 265a and 265c and opens blades 265b and 265d for reversal of motor 87. As the field coils 87f and 87g are continuously energized, motor 87 is started in the reverse direction and rapid retraction of slide 85 takes place. As soon as the current builds up in the armature circuit of motor 87, coil 283 is energized to close blades 283a, Figure 21, and short-circuit starting rheostat 289.

Figure 16:
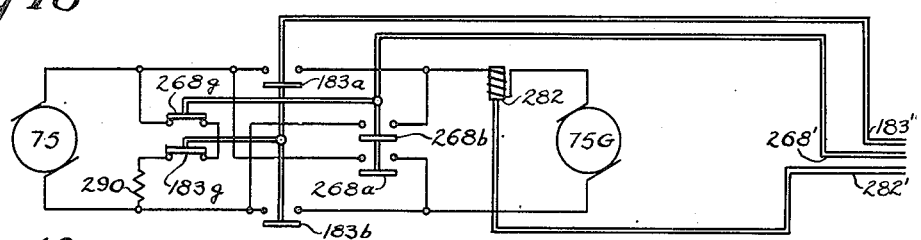

Energization of relay coil 268, closes blades 268a and 268b, Figure 16, to reverse the armature connections of motor 75, and to open blades 268g in series with dynamic brake resistor 290. Also blades 268c, 268d, 268e and 268f, are operated, to condition the motor and generator field coils so that motor 75 now starts in the reverse direction to retract center 59 from the work. Contacts 268h are also opened to open the circuit to the headstock motor relay coil 173 thus stopping the headstock motor 31.

As the slides return, the feed limit buttons on drums 152 and 172 contact and close the respective switches 85d and 170c to thereby energize coils 2A and 4A and advance ratchet relay arms 228 and 247 one step. This movement is without effect since, as will be noted from Figure 20, terminals 231 and 232 are connected as are terminals 250 and 251. As the tailstock spindle 55 and the slides 85, 159, and 170 reach their rapid traverse retraction position, switches 80, 85d, 156b and 170c are operated to energize coils 1A, 2A, 3A and 4A thus advancing all ratchet arms to their final position 224, 233, 244 and 252 thus energizing reset relay coils 269, 267, 264 and 260, respectively. Energization of each of these coils has the same effect as the energization of coil 269 as explained in connection with Figure 22 whereby all ratchet arms are released and each spring corresponding to spring 214, Figure 22, acts to return its relay arm to starting position whereby all motors and parts moved thereby are brought to rest in starting position. The completed work piece is now removed, and replaced by an unfinished work piece, whereupon another cycle of operation may be initiated. A start button 175 is provided in the line 181 to start a new cycle of operation. Depression and release of this start button 175 will advance all step relay arms to the first contact, thus initiating such new cycle.

Thus we have provided a machine which is extremely flexible in that the several functions of the machine are automatically carried out and follow each other in proper sequence. Furthermore, merely by opening the circuit to their ratchet relay control coils, certain of the units may be cut out of operation, while the others will operate as intended and as described. For example, if a certain job does not require the use of rear slide 170, the circuit 277 may be opened and the tailstock, front cross slide and longitudinal motors 75, 87 and 160, will operate as described.

While the apparatus disclosed and described herein constitutes a preferred form of the invention, yet it will be understood that the apparatus is capable of alteration without departing from the spirit of the invention, and that all modifications that fall within the scope of the appended claims are intended to be included herein.

Having thus fully described our invention, what we claim as new and desire to secure by Letters Patent is:

1. In a machine tool having a bed and a reference axis, a cross slide mounted on said bed for translation toward and from said axis, a driving motor, a differential, a driving connection between a first side of said differential and said cross slide, a high speed drive between said motor and a second side of said differential, a slow speed drive between said motor and the third side of said differential, and means including a switch operated by movement of said slide to alternatively render said drives effective and ineffective.

2. In a tool carriage for lathes, a base, a cross slide guided on said base for translation, a motor, a differential, a first drive from one side of said differential to said slide, a slow speed drive from said motor to a second side of said differential and including change gears, a high speed drive from said motor to the third side of said differential, a drum connected to rotate in accordance with translation of said slide, electro-magnetic clutch means alternatively connecting and disconnecting said slow speed and high speed drives, a circuit controlling said electro-magnetic means and including a switch on said slide adjacent said drum, and means adjustably carried on the periphery of said drum for operating said switch means at predetermined positions of said slide.

3. In a tool carriage for lathes, a base, a cross slide guided on and by said base for translation, a differential, a first drive from one side of said differential to said slide, a motor, a first drive from said motor to a second side of said differential and including an electro-magnetic clutch, a second drive from said motor to the third side of said differential and including an electro-magnetic clutch, a drum rotated in timed relation with said slide, a circuit for alternatively energizing said clutches, switch means for controlling said circuit and carried on said slide adjacent said drum, and means adjustable about the periphery of said drum to operate said switch in predetermined position of said slide.

4. In a machine tool, a base, a tool slide on said base, a motor carried by said base, a high speed drive between said motor and slide including a first clutch, a feeding drive between said motor and slide including a second clutch, a drum carried by said base and rotatable in timed relation with movement of said slide, switch means on said slide and translatable along said drum in timed relation with movement of said slide, a relay movable successively into positions controlling said motor and clutches, and means on said drum successively operating said switch means to move said relay successively into said positions in a desired sequence.

5. In a machine tool, a base, a tool slide on said base, a motor carried by said base, a high speed drive between said motor and slide and including a first clutch, a feeding drive between said motor and slide and including a second clutch and change speed gears, a drum carried by said base and connected for rotation in timed relation with movement of said slide, switch means on said slide and translatable along said drum in timed relation with movement of said slide, there being a plurality of apertures in predetermined spaced relation on said drum, each aperture being adapted to receive a switch-actuating button, and a relay switch arm movable successively into positions controlling said motor and clutches, the buttons on said drum actuating said switch means as said slide moves to move said relay switch arm successively into said positions in a desired sequence.

6. In a machine tool, a first member movable with respect to a fixed point through a first cycle of operation, a second member movable with respect to the fixed point through a second cycle of operation, first drive means for driving the first member through said first cycle of operation, second drive means for driving the second member through said second cycle of operation one of said first and second drive means including electrically actuated clutch and brake mechanisms, first electrical control means for governing the first drive means to move the first member through said first cycle of operation, second electrical control means for governing the second drive means to move the second member through said second cycle of operation, first means responsive to the movement of the first member for modifying the second electrical control means, and second means responsive to the movement of the second member for modifying the first electrical control means.

7. In a machine tool, a movable member adapted to be moved with respect to a reference point through a cycle of operation comprising a forward movement and a rearward movement, drive means for driving the member through said cycle of operation, electrical control means including a switch for governing the drive means to drive the member through the cycle of operation, engagement means movable in accordance with said member for engaging the switch during both the forward movement and the rearward movement of the cycle of operation, said switch during the forward movement of the part of the cycle modifying the electrical control means to change the speed of the drive means for the remaining portion of the forward movement of the cycle, means for arresting the forward movement of the member and initiating the reverse movement of the member to return the member to its starting position, and means during the reverse movement to prevent said switch means from modifying the electrical control means whereby the switch is inoperative to change the speed of the movable member throughout the reverse movement of the cycle.

8. In a machine tool having a fixed axis, a machine element adapted to move transversely and longitudinally with reference to the axis, first driving means for driving the machine element transversely of the axis, second driving means for driving the machine element longitudinally of the axis, first electrical control means for controlling the operation of the first driving means and the transverse movement of the machine element, second electrical control means for controlling the operation of the second driving means and the longitudinal movement of the machine element, means for initiating the operation of the first electrical control means for transversely moving the machine element from a starting position toward the axis, said first electrical control means governing the first driving means and moving the machine element from said starting position at a first predetermined speed toward the axis, first means responsive to the transverse movement of the machine element for modifying the first electrical control means for moving the machine element toward the axis at a second predetermined speed as the machine element approaches the axis, second means responsive to the transverse movement of the machine element for arresting the transverse movement of the machine element and thereby determining the operating position of the machine element with reference to the axis, said second means also initiating the operation of the second electrical control means for moving the machine element longitudinally of the axis, and third means responsive to a predetermined longitudinal travel of the machine element with reference to the axis for arresting the longitudinal movement of the machine element, said third means also initiating the reverse operation of the first and second control means for moving the machine element both transversely and longitudinally back to its point of rest.

9. In a machine tool having a reference axis, a movable member to be reciprocally moved relative to the axis through a transverse cycle having a starting position and a begin work operative position and through a longitudinal cycle including said begin work operative position and an end work operative position, first drive means for driving the movable member through said transverse cycle, second drive means for driving the movable member through said longitudinal cycle, first electrical control means for controlling the operation of the first drive means and the transverse movement of the movable member relative to the axis, second electrical control means for controlling the operation of the second drive means and the longitudinal movement of the movable member with respect to the axis, means for initiating the operation of the first electrical control means for moving the movable member from said starting position transversely toward the axis, at a first speed, second means responsive to the transverse movement of the movable member for modifying the first electrical control means for moving the movable member toward the axis at a second predetermined speed as the movable member approaches the axis, third means responsive to the transverse movement of the movable member for changing the first electrical control means to arrest the transverse movement of the movable member at said begin work operative position and thereby determine the operating position of the movable member with reference to the axis, said third means also initiating the operation of the second electrical contral means for moving the movable member from said begin work operative position longitudinally of the axis, and fourth means responsive to a predetermined longitudinal travel of the movable member with reference to the axis for changing the second electrical control means to arrest the longitudinal movement of the movable member at said end work operative position, said fourth means also initiating the reverse operation of the first and second electrical control means for returning the movable member through both the transverse cycle and the longitudinal cycle to its starting position.

10. In a machine tool having first and second movable members and a reference axis, said first movable member being reciprocally movable through an axially disposed cycle having a starting position and a working position, first drive means for driving the first movable member through said cycle, said second movable member adapted to be reciprocally moved relative to the axis through a transverse cycle having a starting position and a begin work operative position and through a longitudinal cycle including said begin work operative position and an end work operative position, second drive means for driving the second movable member through said transverse cycle, third drive means for driving the second movable member through said longitudinal cycle, first electrical control means for controlling the operation of the first drive means and the axial movement of said first movable member with respect to said axis, second electrical control means for controlling the operation of the second drive means and the transverse movement of the second movable member relative to the axis, third electrical control means for controlling the operation of the third drive means and the longitudinal movement of the second movable member with respect to the axis, means for initiating the operation of the first electrical control means for axially moving the first movable member from its starting position toward the axis, first means responsive to the axial movement of the first movable member for changing the first electrical control means to arrest the movement of the first movable member at said working position, said first means also initiating the operation of the second electrical control means for moving the second movable member from said starting position transversely toward the axis, said second electrical control means governing the second drive means and moving the second movable member from said starting position at a first speed toward the axis, second means responsive to the transverse movement of the second movable member for modifying the second electrical control means for moving the second movable member toward the axis at a second predetermined speed as the second movable member approaches the axis, third means responsive to the transverse movement of the second movable member for changing the second electrical control means to arrest the transverse movement of the second movable member at said begin work operative position and thereby determine the operating position of the second movable member with reference to the axis, said third means also initiating the operation of the third electrical control means for moving the second movable member from said begin work operative position longitudinally of the axis, and fourth means responsive to a predetermined longitudinal travel of the second movable member with reference to the axis for changing the third electrical control means to arrest the longitudinal movement of the second movable member at said end work operative position, said fourth means also initiating the reverse operation of the second and third electrical control means for returning the second movable member through both the transverse cycle and the longitudinal cycle to its starting position.

CLIFFORD A. BICKEL.
STANLEY A. BRANDENBURG.
THEODORE FOSTER.

(References on following page)

REFERENCES CITED

The following references are of record in the file of this patent:

UNITED STATES PATENTS

| Number | Name | Date |
|---|---|---|
| 422,874 | Benton | Mar. 4, 1890 |
| 919,986 | Whitney | Apr. 27, 1909 |
| 1,656,351 | Greenleaf | Jan. 17, 1928 |
| 1,667,640 | Stroud | Apr. 24, 1928 |
| 1,680,590 | Bouillon | Aug. 14, 1928 |
| 1,708,903 | Schroder | Apr. 9, 1929 |
| 1,909,135 | Svenson | May 16, 1933 |
| 1,950,332 | Von Pechmann | Mar. 6, 1934 |
| 1,984,718 | Wistrand | Dec. 18, 1934 |
| 2,033,406 | Vancil | Mar. 10, 1936 |
| 2,050,746 | Bickel | Aug. 11, 1936 |
| 2,056,586 | Rohm | Oct. 6, 1936 |
| 2,085,456 | Spicacci | June 29, 1937 |
| 2,105,962 | Bickel | Jan. 18, 1938 |
| 2,198,033 | Duda | Apr. 23, 1940 |
| 2,247,562 | Santen | July 1, 1941 |
| 2,309,669 | Poorman | Feb. 2, 1943 |
| 2,311,438 | Hoyt | Feb. 16, 1943 |
| 2,351,649 | Wintermute | June 20, 1944 |
| 2,358,746 | Tandler | Sept. 19, 1944 |
| 2,368,408 | Brooking | Jan. 30, 1945 |
| 2,370,976 | Lear | Mar. 6, 1945 |
| 2,374,256 | Zimmerman | Apr. 24, 1945 |

FOREIGN PATENTS

| Number | Country | Date |
|---|---|---|
| 7,362 | Austria | May 26, 1902 |